(12) United States Patent
Oh

(10) Patent No.: US 8,212,526 B2
(45) Date of Patent: Jul. 3, 2012

(54) CONTROLLING A CHARGING OPERATION OF A BATTERY BASED ON A CHARGE VOLTAGE AND CUT-OFF CURRENT

(75) Inventor: Jang Geun Oh, Suwon (KR)

(73) Assignee: LG Electronics Inc., Seoul (KR)

( * ) Notice: Subject to any disclaimer, the term of this patent is extended or adjusted under 35 U.S.C. 154(b) by 1406 days.

(21) Appl. No.: 11/427,810

(22) Filed: Jun. 30, 2006

(65) Prior Publication Data

US 2007/0013346 A1    Jan. 18, 2007

(30) Foreign Application Priority Data

Jul. 12, 2005   (KR) .......................... 10-2005-0062962

(51) Int. Cl.
*H02J 7/00*        (2006.01)

(52) U.S. Cl. ........................................ 320/132; 320/134

(58) Field of Classification Search ................... 320/131, 320/132; 324/427, 430, 432, 433, 434; 340/636.1, 340/636.11
See application file for complete search history.

(56) References Cited

U.S. PATENT DOCUMENTS 5,606,242 A * 2/1997 Hull et al. ..................... 320/106
* cited by examiner

*Primary Examiner* — Arun Williams
(74) *Attorney, Agent, or Firm* — Fish & Richardson P.C.

(57) ABSTRACT

A charging operation for a battery includes determining an actual full charge capacity of the battery and a design capacity of the battery. The actual full charge capacity of the battery is compared with the design capacity of the battery. One or more of a charge voltage and a cut-off current, such as with an embedded controller, is adjusted if the actual full charge capacity is less than the design capacity. The battery is controlled by charging the battery with one or more of an adjusted cut-off current and/or an adjusted charge voltage.

17 Claims, 5 Drawing Sheets

FIG. 6A

|   | charge ending current (cut − off current) |   | charge voltage |
|---|---|---|---|
| A | 150mA | D | 12.6V |
| B | 100mA | E | 12.65V |
| C | 50mA | F | 12.7V |

FIG. 6B

| combination of voltage and current | FC bit allocation state of EC |
|---|---|
| A,D | 000 |
| B,D | 001 |
| C,D | 010 |
| C,E | 011 |
| C,F | 100 |

CONTROLLING A CHARGING OPERATION OF A BATTERY BASED ON A CHARGE VOLTAGE AND CUT-OFF CURRENT

BACKGROUND

This description relates to controlling the charging of a battery and maintaining a full charge capacity of the battery by lowering a cut-off current.

A typical portable computing device, such as a notebook computer or a portable digital assistant (PDA), is supplied with a common alternating current using an adaptor, or with power using a battery. Since the typical portable device is frequently carried by a user, the weight and the size of the device and its components, such as the battery, are important.

The battery typically used in the portable device is a rechargeable secondary battery. A secondary battery having a higher energy density is preferred due to the relative compactness and reduced weight of the battery.

One type of secondary battery utilized is a secondary lithium-ion battery that is environmentally less intrusive and relatively light and compact. The lithium-ion battery generally has a long lifespan, conserves energy well, has a high energy density, and has a high operational voltage. Accordingly, the secondary lithium-ion battery is used for portable devices such as personal computers, camcorders, portable phones, CD players, and PDAs.

One type of charging technique for a battery includes applying a preset charging scheme regardless of a design capacity of the battery. For example, a charging scheme for a battery is determined without respect to the design capacity of the battery, and the battery is typically charged according to the predetermined scheme. Accordingly, the charge for the battery is adjusted by compensating for a charge voltage and a charge current for the battery based on the full charge capacity (FCC) of the battery.

SUMMARY

In one general aspect, the charging of a battery is variably controlled to maintain or increase a full charge capacity of the battery and/or to extend the operating time of the battery.

In one general aspect, controlling charging of a battery includes determining an actual full charge capacity of a battery and a design capacity of the battery. The actual full charge capacity of the battery is compared with the design capacity of the battery. One or more of a charge voltage or a cut-off current is adjusted if the actual full charge capacity is less than the design capacity. The battery is controlled by charging the battery with one or more of an adjusted cut-off current or an adjusted charge voltage.

Implementations may include one or more of the following features. For example, adjusting the charge voltage and/or the cut-off current may include increasing the charge voltage and/or lowering the present cut-off current.

The charge voltage and the cut-off may be adjusted by selecting an adjustment state from multiple adjustment states each having a preset charge voltage and a preset cut-off current.

A present charging scheme may be maintained if the actual full charge capacity exceeds the design capacity of the battery.

The charge voltage may be adjusted by incrementally increasing the charge voltage, and the cut-off current may be adjusted by incrementally decreasing the cut-off current. In particular examples, the cut-off current is adjusted by incrementally decreasing the cut-off current and maintaining a preset charge voltage, or the charge voltage is adjusted by incrementally increasing the charge voltage and maintaining a preset cut-off current.

In another general aspect, an apparatus for controlling a charging operation of a battery includes a battery cell and a charging module configured to adjust a cut-off current and a charge voltage of the battery cell. An embedded controller is configured to determine a state of the battery cell and to determine the charge voltage and the cut-off current based on a combination of the charge voltage and the cut-off current. The embedded controller is configured to deliver a control signal to the charging module based on the determined charge voltage and the determined cut-off current.

Implementations may include one or more of the following features. For example, the embedded controller may include a full charge bit output unit configured to set a combination signal that includes the determined charge voltage and a determined cut-off current. The embedded controller may be configured to select the combination signal from combinations of charge voltages and associated cut-off currents. The combinations of charge voltages and associated cut-off currents may be stored in the embedded controller.

The charging module may be configured to incrementally adjust one or more of the cut-off current and the charge voltage. For example, the charging module may be configured to incrementally increase the charge voltage, to incrementally decrease the cut-off current, to incrementally decrease the cut-off current and to maintain a preset charge voltage, or to incrementally increase the charge voltage and to maintain a preset cut-off current.

Other features will be apparent from the following description, including the drawings, and the claims.

BRIEF DESCRIPTION OF THE DRAWINGS

FIG. 6A is a table of cut-off current in relation to charge voltage.

FIG. 6B is a table of a combination of voltage and current in relation to an FC bit allocation state of an embedded controller.

DETAILED DESCRIPTION

Figure 1:
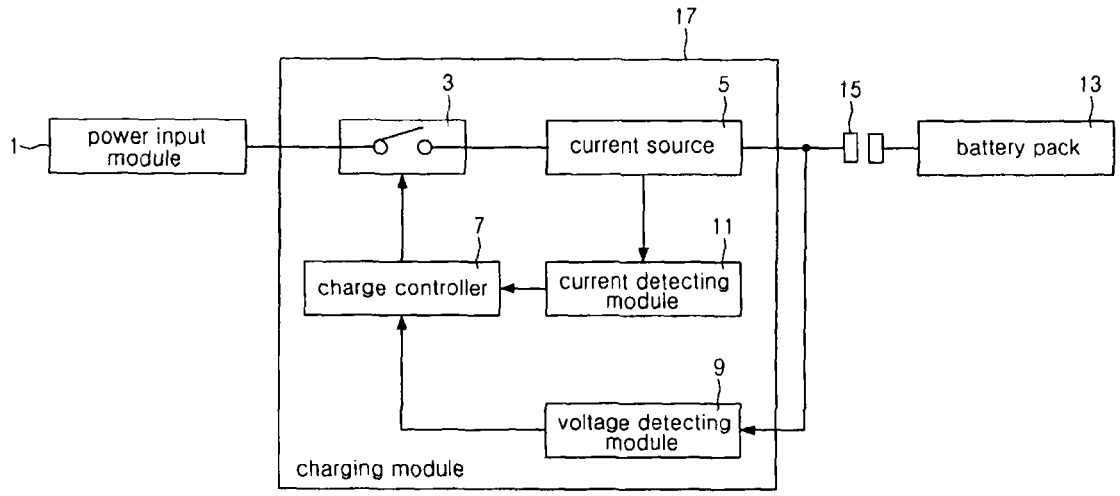
FIG. 1 is a block diagram of an apparatus for controlling charging of a battery.

In the following description and drawings, the same reference numerals are used to designate the same or similar components, and so repetition of the description of the same or similar components will be omitted.

Referring to FIG. 1, an apparatus for controlling charging of a battery through a fixed-charge type charging technique includes a battery constructed in a shape of a cell array inside a battery pack 13. A charging module 17 for charging the battery of the battery pack 13 is connected between the battery pack 13 and a power input module 1 for supplying a charge power to the battery pack 13. The charging module 17 includes a DC/DC switching module 3 for approximately converting a voltage and a current, such that power input through the power input module 1 corresponds to the charge power of the battery.

The charging module 17 includes a current detecting module 11 for detecting a charge current of the battery pack 13 with a current sensor 5. The charging module 17 also includes a voltage detecting module 9 for detecting the voltage of the battery pack 13, and a charge controller 7 for receiving information about a battery current and information about a battery voltage from the current detecting module 11 and the voltage detecting module 9, respectively. The charging module 17 allows a constant-current charge using a preset constant current value until the battery voltage reaches 4.2V/cell. If the battery voltage reaches 4.2V/cell, the charging module allows a constant-voltage charge such that the output voltage of the charging module 17 is maintained at the level of 4.2V/cell.

Figure 2:
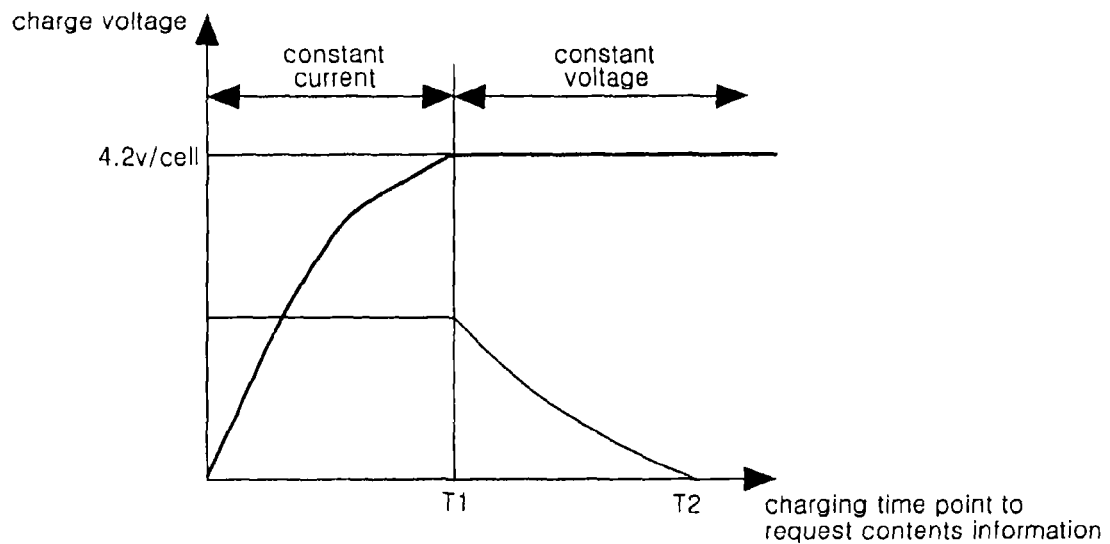
FIG. 2 is a graph of a difference between an output voltage of a charging module and a charge voltage for a battery cell through a conventional technique.

A charge control characteristic of the charge controller 7 is shown FIG. 2. A connection module 15 is included between the charging module 17 and the battery pack 13 to connect the charging module 17 with the battery pack 13.

Figure 3:
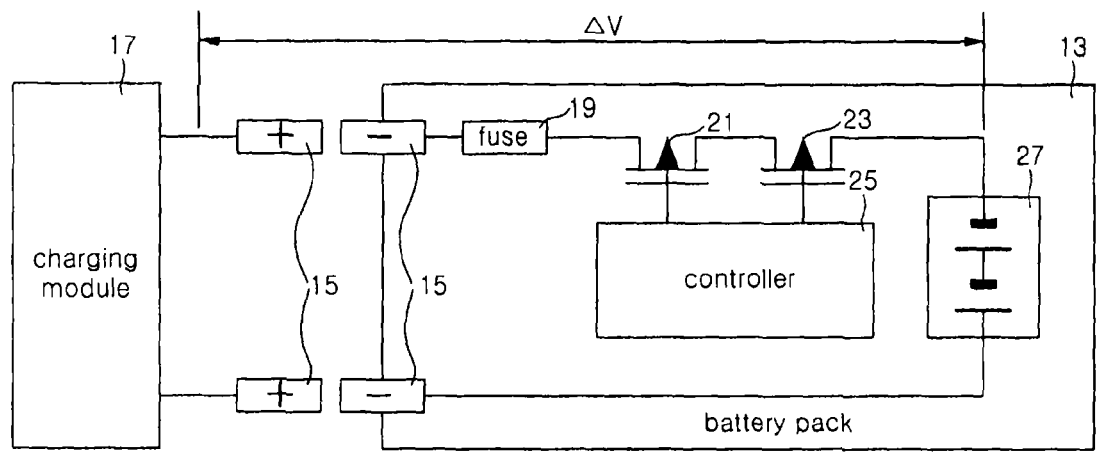
FIG. 3 is a circuit diagram of a battery pack.

Referring to FIG. 3, the battery pack 13 includes a controller 25 used for providing battery information to the charging module 17. In addition, the battery pack 13 includes a battery cell 27 for charging the battery, field-effect transistors 21 and 23 which are charge and discharge switching elements used for providing a charge and discharge path to the battery cell 27, and a fuse 19. The charge and discharge switching elements (i.e., the field-effect transistors 21 and 23) are controlled by the controller 25.

Figure 4:
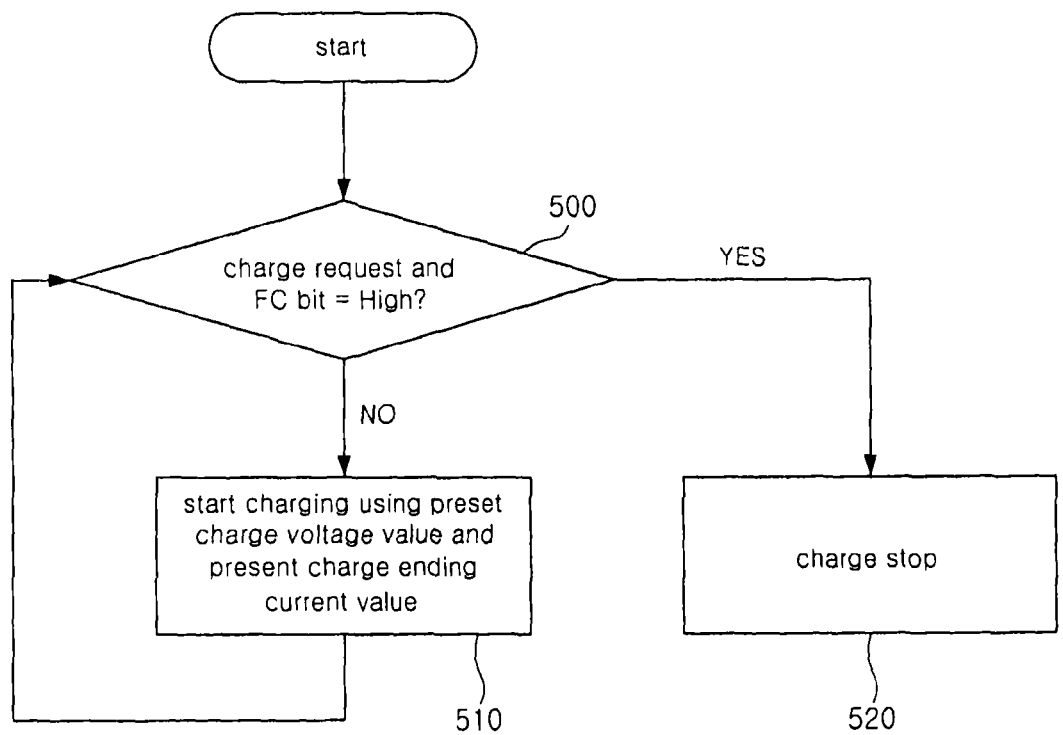
FIG. 4 is a flowchart of an operation for controlling the charging operation of a typical battery.

Referring to FIG. 4, an apparatus for controlling charging of a battery controls charging through an exemplary control procedure. If the controller 2 inside the battery pack 13 requires charging of the battery 27, and the battery is not in a full charge (FC) state (500), the charging module 17 charges the battery using a preset charge voltage and a preset charge ending current based on a characteristic curve shown in FIG. 2 (510). If a voltage and a current charged in the battery reach the preset charge voltage and the preset charge ending current, respectively, the charging is completed and a full charge bit (FC bit) of the controller 25 inside the battery pack 13 is set (520).

The full charge state may be achieved, for example, when the following exemplary conditions are satisfied: taper current<set value (about 150 mA), and battery voltage>set voltage-taper voltage (about 100 mV).

The value of the taper current is gradually reduced from a reference value due to the use of the battery when it is assumed that the reference value is derived from a full charge current (2.8 A). The current value of the taper current is detected when the battery is fully charged after the battery has been completely discharged. Accordingly, a current control according to a battery charging operation is generally performed until the taper current detected during the charging operation for the battery has a value smaller than a preset value.

The value of the taper voltage is gradually reduced from a reference value due to the use of the battery when it is assumed that the reference value is derived from a full charge voltage (2.8 A). The taper voltage is detected when the battery is fully charged after the battery has been completely discharged. Accordingly, a voltage control according to a battery charging operation is generally performed until a battery voltage detected during the battery charging operation is greater than a value obtained by subtracting the taper voltage value from the preset voltage value.

In order to charge batteries, the controller 25 inside the battery pack 13 must request a charging operation. Although a user connects a power adaptor to a notebook computer, if the controller 25 inside the battery pack 13 does not request the charging operation, a charging operation of the battery cell 27 does not occur.

In addition, the controller 25 inside the battery pack 13 does not request a charging operation until the battery charge is reduced to prevent a side effect which may result from frequently reoccurring charging operations.

However, in a battery for a portable device, such as a conventional notebook computer, as the battery is continually used, the performance of the battery is reduced. Although a charging operation may be continuously performed, the full charge capacity of the battery does not reach the initial design capacity for the battery. Accordingly, even though the user fully charges the battery, the maximum charge of the battery reduces over time, which results in a lower usage efficiency of the battery.

Figure 5:
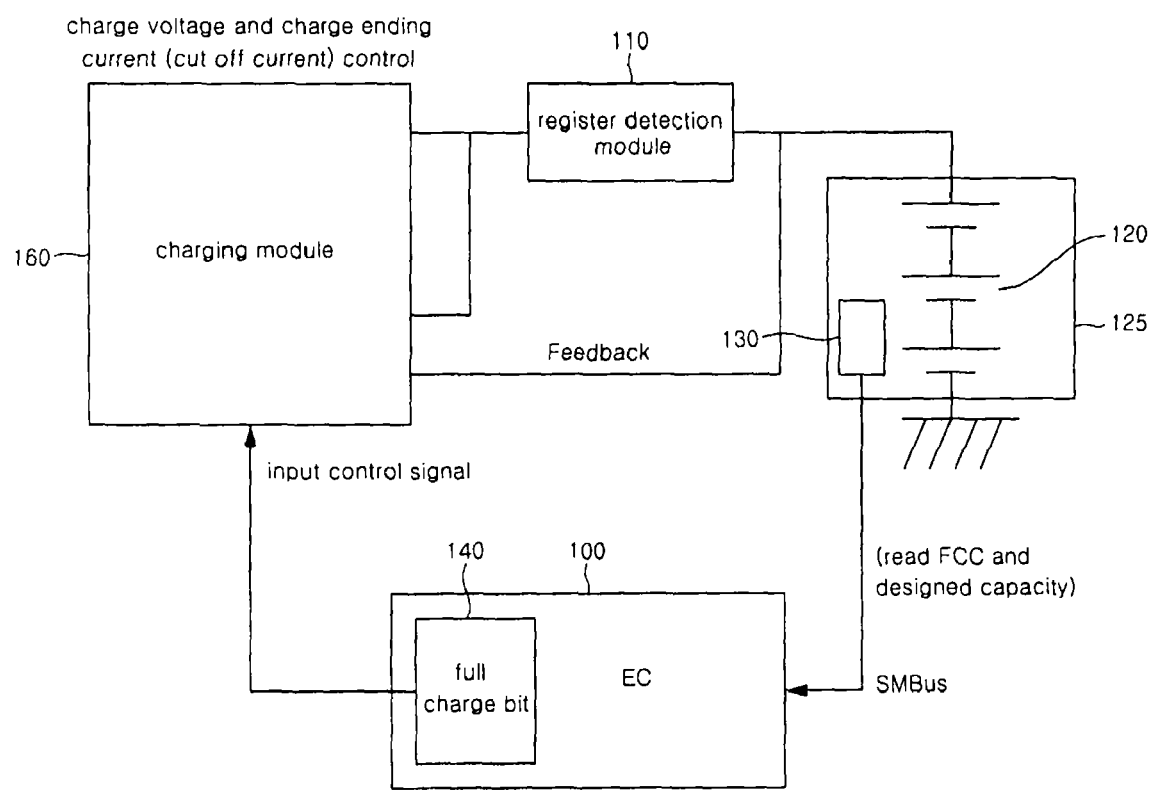
FIG. 5 is a block diagram of a charge control circuit of a battery.
Figure 7:
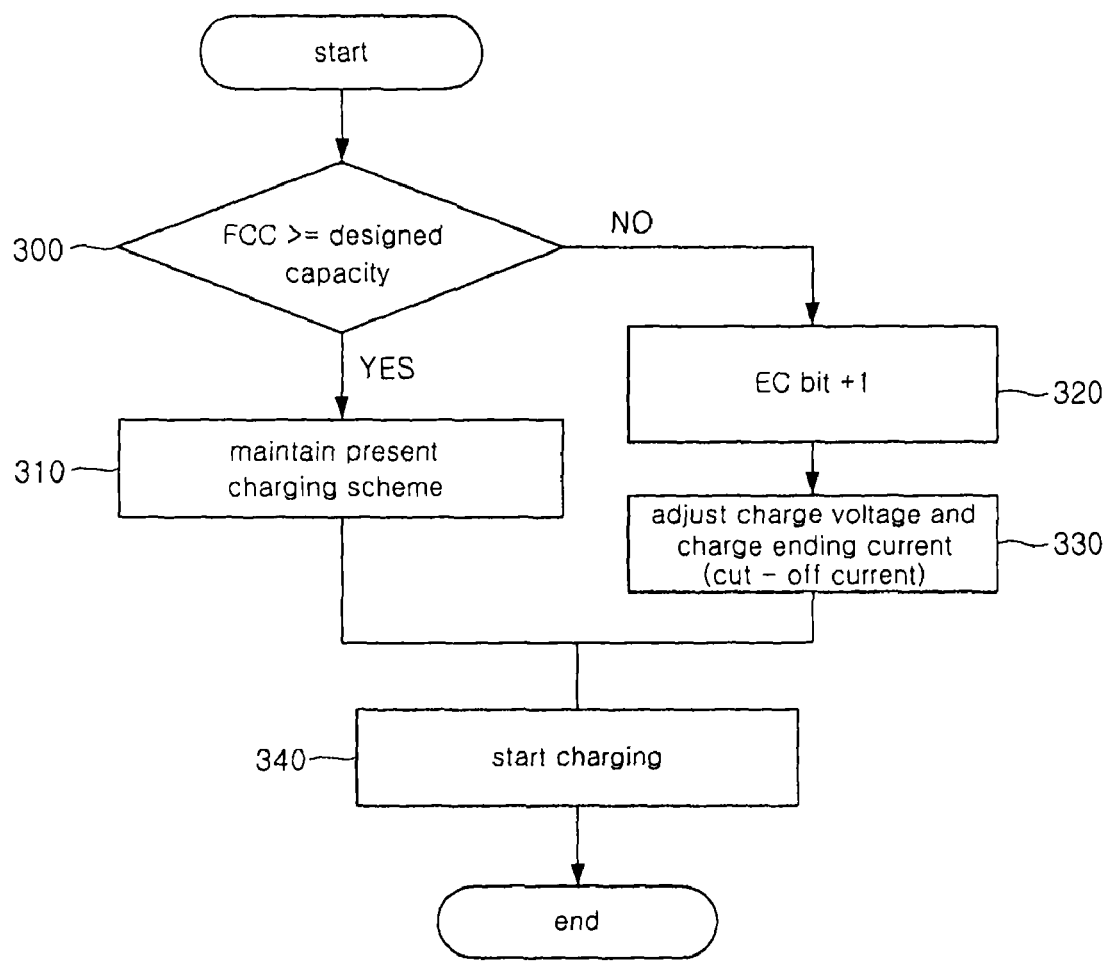
FIG. 7 is flowchart of a charging control operation of a battery.

Referring to FIGS. 5-7, an alternative charging control operation begins at a time point where the level of a full charge capacity of a battery is lower than a design charge capacity of the battery. If the full charge capacity of the battery is less than the design charge capacity, a charge voltage typically fixed to 4.2V is increased.

A charge ending current (a cut-off current) may be set at a preset value, such as, for example, 150 mA. If a current less than 150 mA is applied, an amount of energy applied to the battery typically increases.

Referring to FIGS. 5, 6A and 6B, a battery pack 125 includes a battery cell 120 for charging a battery and an embedded controller 100 for controlling a charging operation. The embedded controller 100 controls the charging operation by detecting a design capacity for the battery cell 120 and a current charged state of the battery cell 120.

The embedded controller 100 controls a charging and discharging operation of the battery cell. For example, the embedded controller 100 inputs a control signal to a charging module 160 for controlling the charging of the battery. The embedded controller 100 detects a design capacity for the battery and an actual (present) full charge capacity of the battery during a battery charging operation. The embedded controller 100 determines and recognizes an appropriate cut-off current and a charge voltage for the battery together with the design charge capacity for the battery and the actual detected full charge capacity of the battery. The embedded controller 100 outputs a control signal to the charging module 160 formed through the combination of a voltage and a current, and sets a full charge bit 140.

The cut-off current and the actual charge voltage of the battery are detected and provided to the embedded controller 100 for controlling a battery charging operation. The embedded controller 100 is connected to the charging module 160 and outputs a control signal used for adjusting the charge to the charging module 160.

The charging module 160 receives a signal representing the allocation state of the battery, which is formed through the combination of the voltage and the current delivered from the embedded controller 100. The signal is received to control the charge voltage and the cut-off current, which are delivered to the battery cell 120 in the battery pack 125. A register detection module 110 detects the value of a current delivered to the battery cell 120 from the charging module 160.

Referring to FIGS. 6A-6B, the cut-off current and the charge voltage are varied according to allocation state. For example, for the full charge bit 140, a cut-off current and a charge voltage may be set as 150 mA, 100 mA, or 50 mA and 12.6V, 12.65V, or 12.7V, respectively.

In addition, the cut-off current and the charge voltage are combined in a single signal to adjust the output state of the full state bit 140 of the embedded controller 100. A bit number allocated to the embedded controller 100 is determined through the combination of each current value and each voltage value. For example, if a cut-off current of A (150 mA) and a voltage of D (12.6V) are combined with each other, the full charge bit 140 allocated to the embedded controller 100 becomes "000". If a cut-off current of B (100 mA) and a voltage of D (12.6V) are combined with each other, the full charge bit 140 allocated to the embedded controller 100 becomes "001". If a cut-off current of C (50 mA) and a voltage of D (12.6V) are combined with each other, the full charge bit 140 allocated to the embedded controller 100 becomes "010". If a cut-off current of C (50 mA) and a voltage of E (12.65V) are combined with each other, the full charge bit 140 allocated to the embedded controller 100 becomes "011". If a cut-off current of C (50 mA) and a voltage of F (12.7V) are combined with each other, the full charge bit 140 allocated to the embedded controller 100 becomes "100".

In an exemplary operational procedure of the control circuit, if the battery pack 125 is mounted on a charging apparatus, a cut-off current and a charge voltage are first checked. The embedded controller 100 detects a design capacity for the battery pack 125 and a present full charge capacity of the battery pack 125. If the present full charge capacity of the battery pack 125 is lower than the design capacity, the amount of charge for the battery pack 125 is adjusted.

A microcomputer 130 of the battery pack 125 detects an amount of charge within the battery cell 120 and outputs the design capacity and the present full charge capacity to the embedded controller 100. The embedded controller 100 reads the design capacity and the present full charge capacity delivered from the microcomputer 130 and detects a state value set on the full charge bit 140 according to a present voltage value and a present current value, e.g., according to the preset relationships shown in FIG. 6.

In addition, the embedded controller 100 adjusts a voltage value and a current value by adding "1" to the state value allocated to the detected full charge bit 140. Thereafter, the embedded controller 100 inputs a current value and a voltage value corresponding to the state value of "a full charge bit value+1" to the charging module 160. Accordingly, a procedure for controlling the charge of the battery pack 125 progresses incrementally according to "a full charge bit value+1."

For example, referring to the tables shown in FIGS. 6A-6B, a state value based on the combination of the current of A and the voltage of D would result in a state value based on the combination of the current of B and the voltage of D which are then used for the charge control as part of the current and voltage adjustment. In addition, a state value based on the combination of the current of C and the voltage of E results in an incremental increase in a state value based on the combination of the current of C and the voltage of F. As described above, if the present full charge capacity is less than the design capacity, the charge voltage value is raised and/or the charge current value is lowered.

The charging module 160 charges the battery pack 125 using the present charge voltage and the cut-off current according to a value delivered from the embedded controller 100. A current value output from the charging module 160 is detected through the register detection module 110. In addition, the charging module 160 can determine whether the present current value is normally output to the register detection module 110 by receiving the output current value through feedback.

Referring to FIG. 7, an operational control procedure for controlling a charging operation of a battery begins with a determination of whether a full charge capacity of the battery equals or exceeds a design capacity (300). Generally, the battery pack 125 experiences a reduced charge efficiency over time when compared with an initial state of the battery pack 125. If the level of an actual full charge capacity of the battery pack 125 is lower than a design capacity for the battery pack 125, the full charge capacity increases through adjustment of a current and/or a voltage so as to reach or maintain the design capacity for the battery pack 125.

If the battery pack 125 is mounted on the battery pack charging device, the microcomputer 130 of the battery pack 125 detects a full charge capacity of the battery cell 120 and delivers the detected full charge capacity and the design capacity for the battery pack 125 to the embedded controller 100.

The embedded controller 100 reads the full charge capacity and the design capacity delivered from the microcomputer 130. The embedded controller 100 then compares the present full charge capacity of the battery cell with the design capacity and determines whether the present full charge capacity exceeds the design capacity (300).

If the present full charge capacity exceeds the design capacity, the present full charge capacity is maintained (310). In addition, a charging operation is performed through a preset charging scheme (340).

In contrast, if the present full charge capacity for the present battery cell 120 is less than the design capacity, the charge efficiency of the battery cell 120 is lower. A charge voltage is increased in order to increase the present full charge capacity, and a full charge bit allocation state value is adjusted in order to lower a cut-off current. Specifically, a value of "1" is added to a state value allocated to the present full charge bit (320) to increase a state value allocated to the present full charge bit.

For example, when a combination of a current and a voltage in the table shown in FIG. 6B is an "A,D" state, if the present full charge capacity is less than the design capacity (300), a value of "1" is added to a value allocated for the full charge bit. Accordingly, the value "000" allocated for the full charge bit, which corresponds to the combination "A,D" of the current and the voltage, is adjusted to the value "001" allocated for the full charge bit. The value 001 corresponds to the combination "B,D" of the current and the voltage.

The following control operation is performed based on the value "001" allocated for the full charge bit. First, the embedded controller 100 adjusts the charge voltage and the cut-off current value based on a value allocated for the adjusted full charge bit (330). The embedded controller 100 then delivers the adjusted charge voltage and the adjusted cut-off current value to the charging module 160. The charging module 160 controls a control operation so that the charging operation for the battery pack 125 can be performed according to the charge voltage and the cut-off current (340).

As described above, if a present full charge capacity is less than a design capacity for a battery, a current and a voltage are manually adjusted so that the efficiency for the present full charge capacity can increase.

A typical battery has a design charge capacity and a present full charge capacity. If the battery is charged through a typical charging operation, the full charge capacity of the battery is slightly higher than or equal to the design capacity by charging the battery according to the design capacity. However, over the life of the battery, the performance of the battery is gradually reduced, such that the actual full charge capacity does not reach the design capacity despite repeated or frequent fixed-type charging operations.

If a fixed type charging scheme is used, the battery is supplied with a constant amount of energy. In addition, the activity of the battery is gradually lowered, such that the capacity of the battery also is lowered.

However, the actual full charge capacity can be maintained at or near design capacity of the battery by increasing the amount of energy used during a charging operation. The increase in the amount of energy applied to the battery is achieved by enhancing a charge voltage and/or reducing the cut-off current of a charging operation. An exemplary cut-off current used for charging the battery may be within the range of approximately 150 to 200 mA. As a result, a full charge capacity is adjusted to the optimum design capacity, so it is possible to increase the charge efficiency of the battery.

Various modifications, additions and substitutions are possible. Accordingly, other implementations are within the scope of the following claims.

What is claimed is:

1. A method for controlling charging of a battery, the method comprising:
    determining an actual full charge capacity of a battery and a design capacity of the battery;
    comparing the actual full charge capacity of the battery with the design capacity of the battery;
    adjusting one or more of a charge voltage or a cut-off current if the actual full charge capacity is less than the design capacity; and
    controlling the battery, wherein controlling the battery includes charging the battery with one or more of an adjusted cut-off current or an adjusted charge voltage.

2. The method according to claim 1, wherein adjusting the charge voltage and the cut-off current comprises increasing the charge voltage and lowering the present cut-off current.

3. The method according to claim 1, wherein adjusting the charge voltage and the cut-off current comprises selecting an adjustment state from a plurality of adjustment states each having a preset charge voltage and a preset cut-off current.

4. The method according to claim 1, wherein controlling the battery comprises maintaining a present charging scheme if the actual full charge capacity exceeds the design capacity of the battery.

5. The method according to claim 1, wherein adjusting the charge voltage comprises incrementally increasing the charge voltage.

6. The method according to claim 1, wherein adjusting the cut-off current comprises incrementally decreasing the cut-off current.

7. The method according to claim 1, wherein adjusting the cut-off current comprises incrementally decreasing the cut-off current and maintaining a preset charge voltage.

8. The method according to claim 1, wherein adjusting the charge voltage comprises incrementally increasing the charge voltage and maintaining a preset cut-off current.

9. An apparatus for controlling a charging operation of a battery, the apparatus comprising:
    a battery cell;
    a charging module configured to adjust a cut-off current and a charge voltage of the battery cell; and
    an embedded controller configured to determine a state of the battery cell and to determine the charge voltage and the cut-off current based on an actual full charge capacity of the battery and a design capacity of the battery, wherein the embedded controller is configured to deliver a control signal to the charging module based on the determined charge voltage and the determined cut-off current.

10. The apparatus according to claim 9, wherein the embedded controller comprises a full charge bit output unit configured to set a combination signal that includes the determined charge voltage and determined cut-off current.

11. The apparatus according to claim 10, wherein the embedded controller is configured to select the combination signal from combinations of charge voltages and associated cut-off currents.

12. The apparatus according to claim 11, wherein the combinations of charge voltages and associated cut-off currents are stored in the embedded controller.

13. The apparatus according to claim 9, wherein the charging module is configured to incrementally adjust one or more of the cut-off current and the charge voltage.

14. The apparatus according to claim 13, wherein the charging module is configured to incrementally increase the charge voltage.

15. The apparatus according to claim 13, wherein the charging module is configured to incrementally decrease the cut-off current.

16. The apparatus according to claim 13, wherein the charging module is configured to incrementally decrease the cut-off current and to maintain a preset charge voltage.

17. The apparatus according to claim 13, wherein the charging module is configured to incrementally increase the charge voltage and to maintain a preset cut-off current.

* * * * *